US012809928B2

(12) United States Patent
Goldstein et al.

(10) Patent No.: US 12,809,928 B2
(45) Date of Patent: *Nov. 24, 2026

(54) RETRIEVAL AND DISPLAY OF CONTENT ASSOCIATED WITH SEARCH FUNCTIONALITY REPRESENTED IN A TASKBAR

(71) Applicant: Microsoft Technology Licensing, LLC, Redmond, WA (US)

(72) Inventors: Katie Elizabeth Goldstein, Hillsborough, CA (US); Katherine Chen Lee, Seattle, WA (US); Ilda Marie Ladeira, Redmond, WA (US); Pavi Bhatter, Fremont, CA (US); Allan Joseph Bonifacio, Toronto (CA); Chelsea Le, Seattle, WA (US); Alexander Leo Campbell, Seattle, WA (US); Bradford Glenn Singley, Renton, WA (US); Zhe Liu, Bellevue, WA (US); Houman Motevaselolhagh, Seattle, WA (US); Arthur Li-Pang Chen, Bellevue, WA (US); Dena Natalie Saunders, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,676

(22) Filed: May 13, 2024

(65) Prior Publication Data

US 2024/0296196 A1 Sep. 5, 2024

Related U.S. Application Data

(63) Continuation of application No. 18/088,558, filed on Dec. 24, 2022, now Pat. No. 12,001,499.

(51) Int. Cl.
*G06F 3/048* (2013.01)
*G06F 3/04817* (2022.01)
(Continued)

(52) U.S. Cl.
CPC ...... *G06F 16/9538* (2019.01); *G06F 3/04817* (2013.01); *G06F 3/0482* (2013.01); *G06F 16/9532* (2019.01)

(58) Field of Classification Search
None
See application file for complete search history.

(56) References Cited

U.S. PATENT DOCUMENTS

| | | | | |
|---|---|---|---|---|
| 11,250,075 | B1 * | 2/2022 | Al Majid | G06F 16/9536 |
| 2012/0290967 | A1 | 11/2012 | Scott et al. | |

(Continued)

OTHER PUBLICATIONS

"KB5011543 (OS Builds 19042.1620, 19043.1620, and 19044.1620) Preview", Retrieved From: https://support.microsoft.com/en-us/topic/march-22-2022-kb5011543-os-builds-19042-1620-19043-1620-and-19044-1620-preview-4fe2d1c0-720f-47fe-9523-75339bc107a1, Mar. 22, 2022, 8 Pages.

(Continued)

*Primary Examiner* — Thanh T Vu
(74) *Attorney, Agent, or Firm* — Shook, Hardy & Bacon L.L.P.

(57) ABSTRACT

A computing device is configured to perform acts that include displaying a graphical user interface (GUI) of an operating system installed on the computing device, where a taskbar of the GUI includes a search box. The search box includes: 1) a text entry field that is configured to receive textual input; and 2) a graphical icon. The acts also include detecting a selection of the text entry field and presenting a first graphical pane on the display in response to detecting the selection of the text entry field, where the first graphical pane includes first content. The acts also include detecting a (Continued)

selection of the graphical icon. The acts further include presenting a second graphical pane on the display in response to detecting the selection of the graphical icon, where the second graphical pane comprises second content that is different from the first content.

20 Claims, 10 Drawing Sheets

(51) Int. Cl.
*G06F 3/0482* (2013.01)
*G06F 16/9532* (2019.01)
*G06F 16/9538* (2019.01)

(56) References Cited

U.S. PATENT DOCUMENTS

2015/0006505 A1* 1/2015 Plakhov ............. G06F 16/3328
707/710
2017/0316051 A1* 11/2017 Kitamorn ............ G06F 16/2428
2018/0189343 A1 7/2018 Embiricos et al.
2020/0334730 A1* 10/2020 Westlake ............... G06N 20/00
2023/0153360 A1* 5/2023 Epstein .............. G06Q 30/0275
707/758
2024/0211523 A1 6/2024 Goldstein

OTHER PUBLICATIONS

"Releasing Windows 10 Build 19044.1618 to Release Preview Channel", Retrieved From: https://blogs.windows.com/windows-insider/2022/03/14/releasing-windows-10-build-19044-1618-to-release-preview-channel/, Mar. 14, 2022, 7 Pages.
Campbell, Alexander, "Group configuration: search highlights in Windows", Retrieved From: https://techcommunity.microsoft.com/t5/windows-it-pro-blog/group-configuration-search-highlights-in-windows/ba-p/3263989, Mar. 22, 2022, 9 Pages.
Langowski, et al., "Announcing Windows 11 Insider Preview Build 22572", Retrieved From: https://blogs.windows.com/windows-insider/2022/03/09/announcing-windows-11-insider-preview-build-22572/, Mar. 9, 2022, 20 Pages.
"Non-Final Office Action Issued in U.S. Appl. No. 18/088,558", Mailed Date: Jun. 9, 2023, 13 Pages.
"Notice of Allowance Issued in U.S. Appl. No. 18/088,558", Mailed Date: Jan. 31, 2024, 7 Pages.
"Response to Non-Final Office Action Issued in U.S. Appl. No. 18/088,558", filed Dec. 7, 2023, 14 Pages.

* cited by examiner

RETRIEVAL AND DISPLAY OF CONTENT ASSOCIATED WITH SEARCH FUNCTIONALITY REPRESENTED IN A TASKBAR

RELATED APPLICATION

This application is a continuation of U.S. patent application Ser. No. 18/088,558, filed on Dec. 24, 2022, and entitled "RETRIEVAL AND DISPLAY OF CONTENT ASSOCIATED WITH SEARCH FUNCTIONALITY REPRESENTED IN A TASKBAR", the entirety of which is incorporated herein by reference.

BACKGROUND

Computing devices have operating systems installed thereon that manage hardware and software of the computing devices. Modern operating systems have graphical user interfaces (GUIs) that include graphical icons, where a user of a computing device can interact with the computing device by way of the graphical icons and an input mechanism, such as a mouse, keyboard, touch sensitive display, microphone, camera, depth sensor, etc. Many operating system GUIs include taskbars that are located on a boundary of GUIs of the operating systems (e.g., a taskbar is often located along a bottom of GUIs of operating systems). A conventional taskbar in a GUI of an operating system installed on a computing device includes graphical icons that are selectable by a user, where the graphical icons correspond to applications installed on the computing device, and further where an application is initiated or made active upon a graphical icon that represents the application being selected. The conventional taskbar also includes a "start" button, where a list of applications installed on the computing device and/or a list of files recently interacted with by a user of the computing device are presented upon the "start" button being selected.

Further, the conventional taskbar includes graphical elements that correspond to search functionality, where data stored on the computing device and/or data available by way of the World Wide Web can be searched based upon user interaction with the graphical elements. For example, the conventional taskbar includes a text entry field that is selectable and, upon being selected, is configured to receive textual input (e.g., a query) from a user of the computing device. Upon the text entry field being selected, the GUI of the operating system is updated to include a graphical pane, where the graphical pane includes graphical icons that represent applications installed on the computing device that have been recently used by the user of the computing device, queries previously set forth by the user of the computing device by way of the text entry field, and graphical icons that represent applications installed on the computing device that can be employed to search for content stored on the computing device. In addition, as text is received in the text entry field and/or upon the user submitting a completed query by way of the text entry field, a search can be conducted over data stored on the computing device and/or data that is available by way of the World Wide Web.

It can be ascertained that search functionality corresponding to the text entry field included in the taskbar of the GUI of the operating system is reactive in nature, particularly with respect to data that is retrievable by way of the World Wide Web. In other words, data is returned from the World Wide Web only in response to receipt of textual input in the text entry field, and therefore data is returned only upon an explicit request for such data by the user.

SUMMARY

The following is a brief summary of subject matter that is described in greater detail herein. This summary is not intended to be limiting as to the scope of the claims.

Described herein are various technologies pertaining to proactive provision of data to a user of a computing device. More specifically, a computing device has an operating system installed thereon, where the operating system has a graphical user interface (GUI), and further where the GUI includes a taskbar that comprises a graphical element that represents search functionality that is available on the computing device. Data is provided to the computing device by a server computing system that is in network communication with the computing device, where the data includes, for example, a graphical icon and first content, where the graphical icon is representative of the first content. For example, when the first content comprises images that pertain to a holiday, the graphical icon comprises a character that is associated with the holiday. Upon receipt of the data, the graphical element in the taskbar is updated to include the graphical icon. For instance, the graphical element may be a search box that includes a text entry field and the graphical icon.

Different information is presented in the GUI of the operating system to the user depending upon whether a selection of the text entry field is detected or a selection of the graphical icon is detected. When a selection of the graphical icon is detected, a first graphical pane is presented in the GUI of the operating system, where the first graphical pane includes the first content. As noted above, the first content is thematically related to the graphical icon, and therefore the graphical icon can indicate to the user a theme of the first content prior to the user selecting the graphical icon. For instance, the first content can include an image and accompanying text that is descriptive of content of the image. In another example, the first content includes multiple images that are thematically related (and thematically related to the graphical icon included in the search box). In still yet another example, the first content includes information that is specific to the user of the computing device and an enterprise to which the user belongs. Thus, the first content can include information about an upcoming meeting identified in an electronic calendar of the user of the computing device, information about frequent contacts of the user of the computing device, and so forth.

In contrast, when a selection of the text entry field is detected, a second graphical pane is presented in the GUI of the operating system. The second graphical pane includes second content, such as a list of applications installed on the computing device that were previously employed by the user of the computing device, a static list of query suggestions, etc. It can be ascertained that the second content differs from the first content, and therefore the GUI displays different information depending upon which portion of the search box is selected.

With more detail pertaining to the data provided to the computing device by the server computing system, the server computing system can provide updated data periodically (e.g., every 6 hours, every 12 hours, every 24 hours, every week, etc.), upon occurrence of a predefined event (such as the computing device being powered on and/or the operating system authenticating the user), etc. Further, the server computing system can select the data to provide to the computing device based upon at least one of the following features: 1) a geographic region assigned to the computing device (e.g., a time zone, a country, a state, a city, a zip code, etc.); 2) a type of account of the user who is logged into the computing device (e.g., a "consumer" account or an "enterprise" account); and/or 3) an account identifier of the user. Therefore, the data provided to the computing device may be customized based upon the geographic region assigned to the computing device, such that the computing device receives different data than what is provided to another computing device that is assigned to a different geographic region. Further, the data provided to the computing device may be customized for an enterprise to which the user belongs, and may be further customized based upon the identifier for the user. Thus, the computing device that is assigned to the enterprise receives different data than what is provided to another computing device that is assigned to another enterprise, and further the computing device that is assigned to the account identifier of the user receives different data than what is provided to another computing device that assigned to another user (whether or not the another computing device is assigned to the enterprise or a different enterprise).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
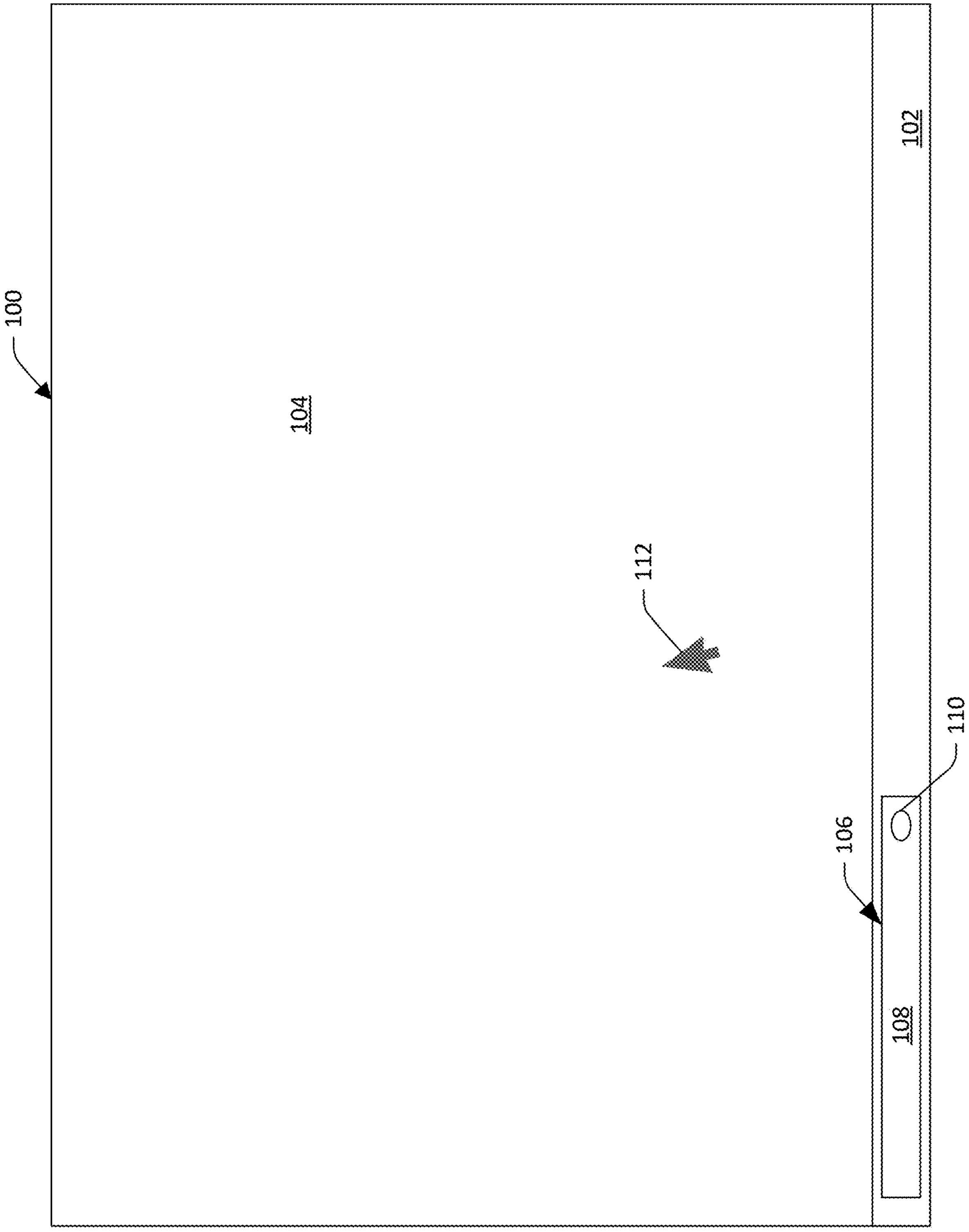
FIG. 1 is a schematic that depicts a graphical user interface (GUI) of an operating system presented on a display of a computing device.

Various technologies pertaining to proactive provision of data to a computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to proactive presentment of content on a display of a computing device, where such content can be presented on the display when a user interacts with a graphical element in a taskbar included in a graphical user interface (GUI) of an operating system of the computing device, and further where the graphical element corresponds to search functionality that is available by way of the graphical element. As will be described in greater detail below, the graphical element can be or include a graphical icon that is indicative of a theme or a topic of content that will be presented on the display upon the graphical icon being selected. In an example, when the content is about a holiday, the graphical icon can be or include graphics that are representative of the holiday (such as a character that is known to be associated with the holiday). Upon the graphical icon being selected by a user of the computing device, the content is presented in a graphical pane. Therefore, in contrast to conventional technologies, content is proactively retrieved and presented to the user on the display when user selection of the graphical icon is detected.

Referring now to FIG. 1, a schematic that depicts a GUI 100 of an operating system installed on a computing device is illustrated. The computing device can be any suitable computing device, including but not limited to a desktop computing device, a laptop computing device, a tablet computing device, a mobile telephone, a wearable computing device (including a watch or headgear), etc. The GUI 100 includes a taskbar 102 that is positioned along a border of the GUI 100 when the GUI 100 is presented on a display of the computing device (and therefore the taskbar 102 is positioned along a border of the display). As illustrated in FIG. 1, the taskbar 102 is positioned along a bottom of the GUI 100. It is to be understood, however, that the taskbar 102 can be placed along a different border of the GUI 100 (such as either side or the top). In another example, the taskbar 102 can be positioned slightly above the border of the GUI 100, or otherwise near a border of the GUI 100.

While not illustrated, the taskbar 102 can include selectable graphical icons that represent applications that can be initiated or made active upon selection of such graphical icons. For instance, the taskbar 102 can include a graphical icon that is representative of an e-mail application, where the e-mail application is launched or made the active application upon the graphical icon being selected.

The GUI 100 further includes a primary display area 104. While in FIG. 1 the primary display area 104 is illustrated as being empty, the primary display area 104 you can include: 1) selectable icons that are representative of applications and/or files; 2) windows that depict lists of file folders, files, applications, etc.; 3) GUIs of applications that are being executed by the computing device, amongst other graphics. Typically, the taskbar 102 remains displayed regardless of content is presented in the primary display area 104 of the GUI 100.

The taskbar 102 additionally includes a search box 106 that is representative of search functionality that is performable by the computing device. Hence, the search box 106 is intended to indicate to a user of the computing device that search of content stored on the computing device and/or content available by way of the World Wide Web is available through use of the search box 106.

The search box 106 includes a text entry field 108, where upon the text entry field 108 being selected (by way of a mouse, keyboard strokes, touch sensitive display, voice command, gesture, etc.), the text entry field 108 is activated to receive textual input. The search box 106 further includes a graphical icon 110. As will be described herein, the graphical icon 110 can be updated from time to time (e.g., weekly, daily, every 12 hours, every 6 hours, upon occurrence of a predefined event, etc.), and is indicative of a theme or topic of content that is presentable to the user of the computing device upon the graphical icon 110 being selected.

A pointer 112 can be employed in connection with selecting graphical elements displayed in the GUI 100, where position of the pointer 112 is based upon a corresponding position of a mouse, position of the gaze of a user relative to the display, position of a digit on a touch-sensitive display, etc. In example, the text entry field 108 and the graphical icon 110 are selectable through use of the pointer 112. As will be described in greater detail herein, different content can be presented to the user on the display depending upon whether the text entry field 108 or the graphical icon 110 is selected.

Figure 2:
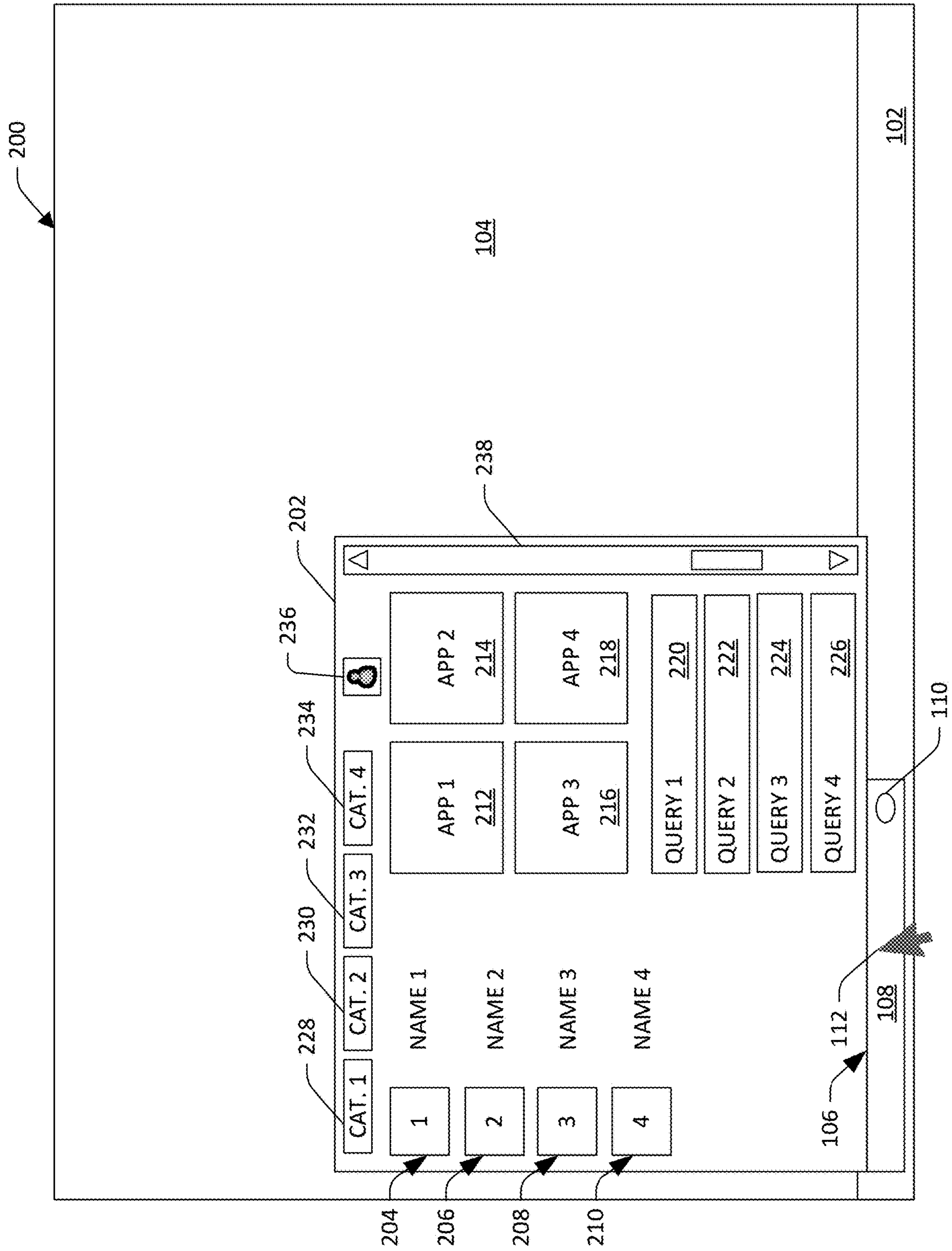
FIG. 2 is a schematic that depicts a graphical pane that includes content, where the graphical pane is presented in a GUI of an operating system in response to a selection of a text entry field in a taskbar included in the GUI.

Now referring to FIG. 2, a GUI 200 of the operating system of the computing device is depicted, where the GUI 200 corresponds to user-selection of the text entry field 108 in the taskbar 102. As illustrated in FIG. 2, the pointer 112 is positioned over the text entry field 108 and employed in connection with selecting the text entry field 108. Selection of the text entry field 108 can be detected by ascertaining that the pointer 112 is hovered over the text entry field 108 for some threshold amount of time, by ascertaining that a button on a mouse has been clicked when the pointer 112 is placed over the text entry field 108, by ascertaining that a digit has touched a touch-sensitive display at a location on the display that corresponds to the text entry field 108, and so forth. Upon selection of the text entry field 108 being detected, a first graphical pane 202 is presented in the GUI 200 of the operating system (and displayed on the display of the computing device). The first graphical pane 202 includes first content. The first content 202 can include graphical elements 204-210 that are representative of applications and/or files that have been recently interacted with by a user of the computing device. The graphical elements 204-210 can include graphical icons and corresponding names of the applications and/or files represented by the graphical elements 204-210. For example, the first graphical element 204 can represent a word processing file recently edited by a user of the computing device. The graphical icon in the first graphical element 204 can represent an application that can be used to edit the word processing document, and the first graphical element 204 can additionally include a name of the word processing file. Upon the first graphical element 204 being selected, the word processing file represented by the first graphical element 204 can be opened in the application identified by the graphical icon included in the first graphical element 204. While the first graphical pane 202 is illustrated as including the four graphical elements 204-210, it is understood that the first graphical pane 202 can include more or fewer elements than four graphical elements.

The first content included in the first graphical pane 202 can further comprise graphical icons 212-218 that are representative of applications that are installed on the computing device. In an example, upon the first graphical icon 212 being selected, the application (app 1) represented by the first graphical icon 212 is launched by the computing device.

The first content included in the first graphical pane 202 can further comprise query suggestions 220-226. The query suggestions 220-226 can be static query suggestions, in that the query suggestions 220-226 are displayed each time that the text entry field 108 is selected by the user. For example, the first query suggestion 220 can be "weather", the second query suggestion 222 can be "finance", and so forth. In another example, the query suggestions 220-226 may include queries previously set forth in the text entry field 108 by the user of the computing device.

The first graphical pane 202 may further include selectable buttons or tabs 228-234 that represent different categories of information that can be searched over based upon a query set forth in the text entry field 108. For instance, the first button 228 can represent applications, such that when the first button 228 is selected, a list of applications installed on the computing device is presented in the first graphical pane 202. In another example, the second button 230 represents files; upon the second button 230 being selected, a list of files stored in a computer readable data store of the computing device is presented in the first graphical pane 202.

The first graphical pane 202 can also include a button 236 that corresponds to an account of the user of the computing device. Upon the button 236 being selected, information about the account of the user is presented in the first graphical pane 202, including (optionally) interactive elements that allow the user to switch the account of the user (to another account of the user or to an account of a different user of the computing device).

The first graphical pane 202 may include a slide bar 238 that can be interacted with by the user to present information additional information (that does not fit within the display region of the first graphical pane 202). As illustrated in FIG. 2, the first graphical pane 202 can be presented above the search box 106 and in line with the left side of the search box 106, such that the first graphical pane 202 appears to be extending from the search box 106 and/or the taskbar 102.

In summary, upon selection of the text entry field 108 of the search box 106 being detected, first content is presented in the first graphical pane 202 in the GUI 200 of the operating system of the computing device.

Figure 3:
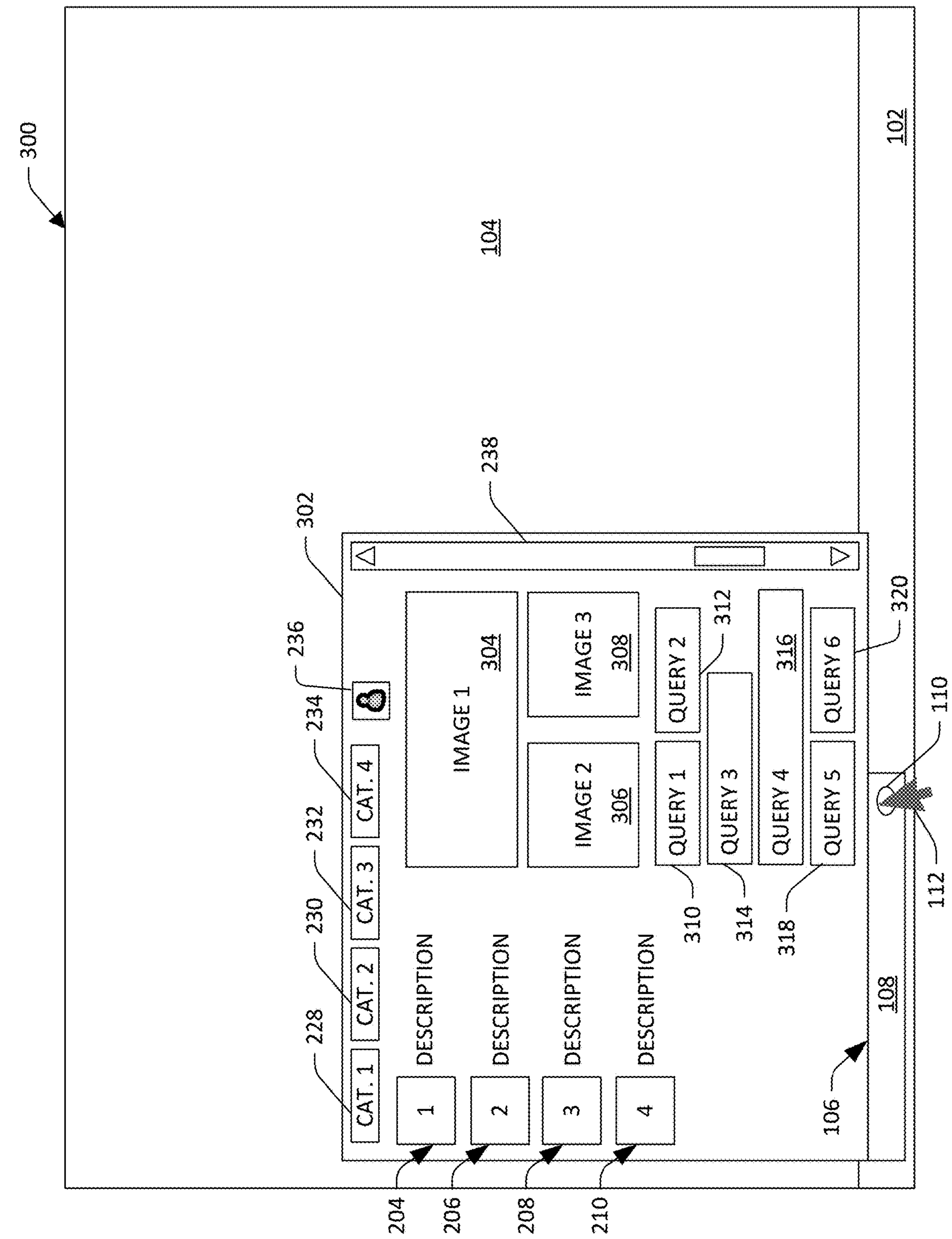
FIG. 3 is a schematic that depicts a graphical pane that includes content, where the graphical pane is presented in a GUI of an operating system in response to a selection of a graphical icon in a search box of a taskbar included in the GUI.

Now referring to FIG. 3, a schematic of a GUI 300 of the operating system of the computing device is illustrated. As shown in FIG. 3, the pointer 112 is positioned over the graphical icon 110 in the search box 106, and the graphical icon 110 is detected as being selected. For example, the computing device can detect that the graphical icon 110 has been selected based upon the pointer 112 hovering over the graphical icon 110 for a threshold amount of time, based upon a mouse button being selected when the pointer 112 is positioned over the graphical icon 110, etc.

Upon selection of the graphical icon 110 being detected, the computing device presents a second graphical pane 302 in the GUI 300, where the second graphical pane 302 includes second content that is different from the first content shown in the first graphical pane 202 (FIG. 2). Therefore, different content is presented depending upon whether the text entry field 108 or the graphical icon 110 is detected as being selected.

In an example, the second graphical pane 302 is the same size and shape as the first graphical pane 202. In addition, some of the content presented in the second graphical pane 302 can be the same as some of the content depicted in the first graphical pane 202. For example, the second graphical pane 302 includes the graphical elements 204-210, the buttons or tabs 228-234, and the button 236. The second graphical pane 302, however, includes some content that is different from the content included in the first graphical pane 202. In a non-limiting example, the second graphical pane 302 includes images 304-308, where the images 304-308 correspond to respective webpages that are available by way of the World Wide Web. Further, the images 304-308 may have text corresponding thereto that is descriptive of the images 304-308, may have queries that can be used to retrieve webpages that correspond to the images 304-308, etc. Accordingly, when the first image 304 is selected, a web browser can be caused to load the webpage that corresponds to the first image 304 in a tab of the web browser.

The second graphical pane 302 can further include query suggestions 310-320. The query suggestions 310-320 can be trending queries that have been submitted to a search engine by users of the search engine (queries that have been recently submitted to the search engine by several users of the search engine). Accordingly, in contrast to the query suggestions 220-226 (FIG. 2) included in the first graphical pane 202, the query suggestions 310-320 can alter over time and may not have been previously submitted to a search engine by the user of the computing device. In an example, upon the third query suggestion 314 being selected, the third query suggestion 314 can be provided to a search engine as a query and search results identified by the search engine can be returned to the computing device. Optionally, the search results can be presented in the second graphical pane 302. In another example, the search results are presented in a web browser that is launched or activated upon the third query suggestion 314 being selected.

In an example, at least a portion of the second content shown in the second graphical pane 302 is a function of information assigned to the computing device. For example, the images 304-308 are provided to the computing device based upon a geographic region assigned to the computing device. For instance, the geographic region is specified in account information of the user of the computing device. The geographic region can be a time zone, a country, a state, a city, a zip code, etc. In addition, the graphical icon 110 included in the search box 106 can be based upon the geographic region assigned to the computing device. Therefore, at a same point in time, search boxes in taskbars of operating systems of two different computing devices can include two different graphical icons. Likewise, at a same point in time, different content can be presented to different computing devices upon detection of a selection of graphical icons in search boxes of GUIs shown on displays of the computing devices.

In addition, content included in the second graphical pane 302 is based upon a type of an account of a user of the computing device and identifier of the user of the computing device. In the example shown in FIG. 3, the content displayed in the second graphical pane 302 can be provided to the computing device based upon the type of the account of the user of the computing device being "consumer", meaning that the account of the user is not assigned to an enterprise to which the user of the computing device belongs.

At least some of the content shown in the second graphical pane 302 can be updated from time to time. For example, content that is presented in the second graphical pane 302 is updated every day at midnight. Thus, when the user selects the graphical icon 110 at a first point in time prior to midnight, the images 304-308 and query suggestions 310-320 are included in the second graphical pane 302. When the user selects the graphical icon 110 after midnight, however, different images and query suggestions are presented in the second graphical pane 302.

The images 304-308 included in the second graphical pane 302 can be manually curated for presentment to users who select the graphical icon 110. Therefore, a person or a team of people can be tasked with creating content that is believed to be of interest to users whose computing devices are assigned to a specific geographic region. Therefore, at least one image in the images 304-308 is manually curated for presentment on the display and is further based upon a geographic region that corresponds to the computing device. In another example, at least one of the images 304-308 can be programmatically selected for providing to the computing device for inclusion in the second graphical pane 302. For instance, the image 306 can represent a "word of the day", which can be programmatically identified. Optionally, programmatically selected images are further based upon a geographic region that corresponds to the computing device.

Further, the images 304-308 and the graphical icon 110 may conform to a same theme. For instance, a day when the computing device is being used can be a national holiday. In such an example, the graphical icon 110 is a symbol of the national holiday and the images 304-308 include content that is associated with the national holiday. Thus, the graphical icon 110 is indicative of at least some of the content that is to be presented upon the graphical icon 110 being selected.

Figure 4:
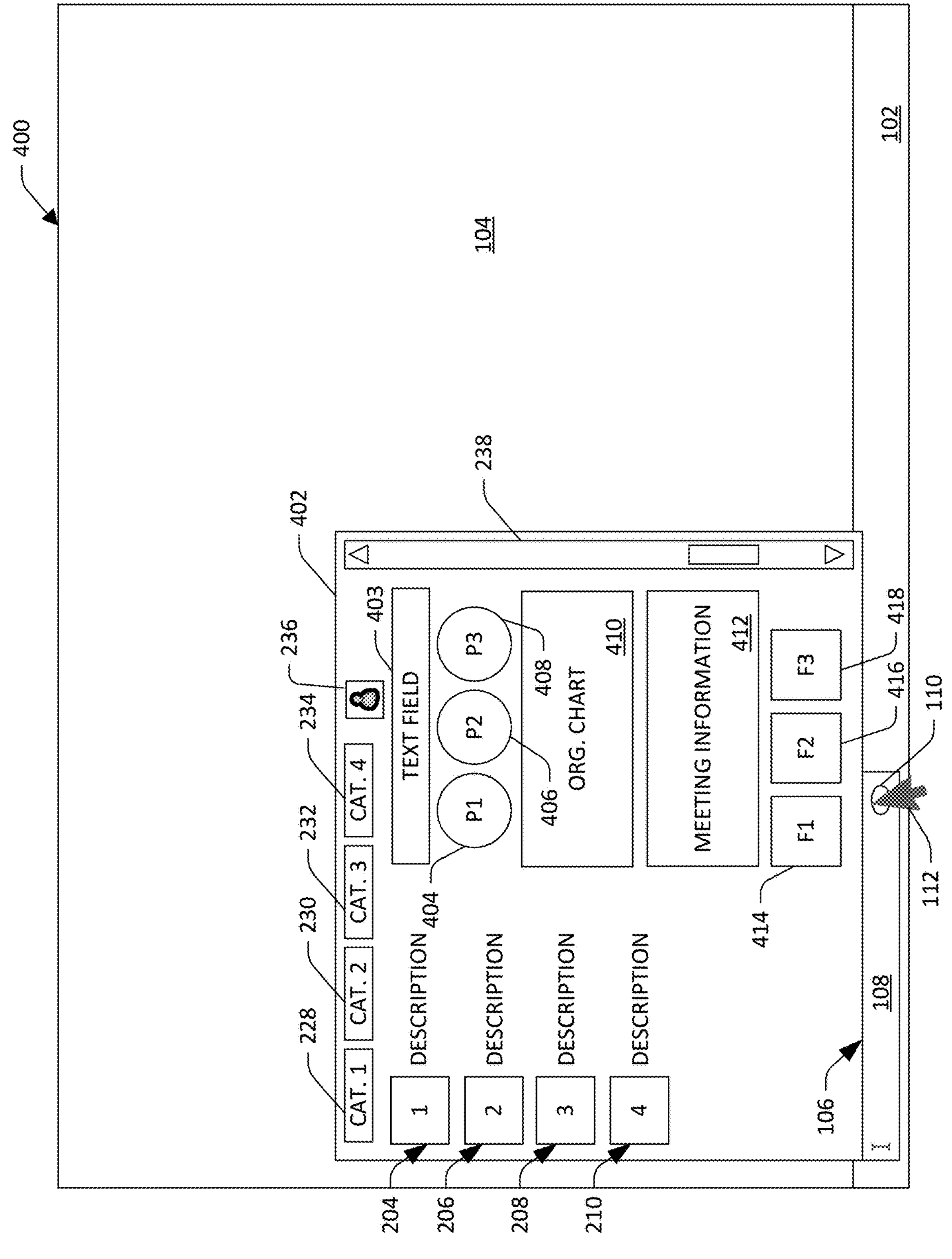
FIG. 4 is a schematic that depicts a graphical pane that includes content, where the graphical pane is presented in a GUI of an operating system in response to a selection of a graphical icon in a search box of a taskbar included in the GUI.

Now referring to FIG. 4, a GUI 400 of the operating system of the computing device is presented. In FIG. 4, an account of the user of the computing device is of an "enterprise" type. The account type "enterprise" indicates that the computing device is assigned to a particular enterprise (for example, a company that employs the user of the computing device). Based upon the account type being "enterprise", the graphical icon 110 can indicate that information pertaining to the user of the computing device with respect to the enterprise will be presented upon the graphical icon 110 being selected. When selection of the graphical icon 110 is detected, a third graphical pane 402 is presented in the GUI 400. Contrary to the content included in the first graphical pane 202 (FIG. 2) and the second graphical pane 302 (FIG. 3), the third graphical pane 402 can include a second text entry field 403 that is configured to receive textual input from the user upon the text entry field 403 being selected. When a query is submitted by way of the text entry field 403, a search can be conducted for people who belong to the same enterprise as the user.

The third graphical pane 402 may further include graphical elements 404-408 that are representative of people in the enterprise who are believed to be of interest to the user of the computing device. For instance, people with whom the user of the computing device often interacts, people with whom the user of the computing device has a meeting scheduled with at a relatively near time in the future, etc. The graphical elements 404-408 may include images of people, avatars that represent people, etc. The graphical elements 404-408 may further optionally include text that identifies the people. Upon a graphical element in the graphical elements 404-408 being selected, an application that can be employed to communicate with the person represented by the selected graphical element can be launched or activated (such as an email application, a unified communications application, a video conferencing application, an instant messaging application, etc.).

The third graphical pane 402 can further optionally include a graphical element 410 that is representative of an organizational chart (or a portion of an organizational chart) of the enterprise to which the user of the computing device belongs. For example, the graphical element 410 can include a chart that represents a position of the user in the hierarchy of the enterprise, including an identity of a person to whom the user reports, an identity of a person who reports to the user, identities of people in the same level of the organization hierarchy, and so forth.

The third graphical pane 402 may further include a graphical element 412 that is representative of a meeting that is on an electronic calendar of the user of the computing device. The graphical element 412 may include information such as a time and date of the meeting, attendees of the meeting, and so forth. Upon the graphical element 412 being selected, an electronic calendar application can be activated or launched on the computing device.

The third graphical pane 402 may further optionally include graphical elements 414-418 that are representative of files that are believed to be of interest to the user of the computing device. The files represented by the graphical elements 414-418 may be referenced in or attached to an electronic meeting represented by the graphical element 412, may be files that have been previously interacted with by the user of the computing device, may be files that colleagues have recently interacted with, etc. As with the content in the second graphical pane 302 shown in FIG. 3, the content included in the third graphical pane 402 can be periodically updated (e.g., every hour, every two hours, every day, etc.). Thus, depending upon a time, the graphical icon 110 may be updated and/or content presented in the third graphical pane 402 may be updated.

Figure 5:
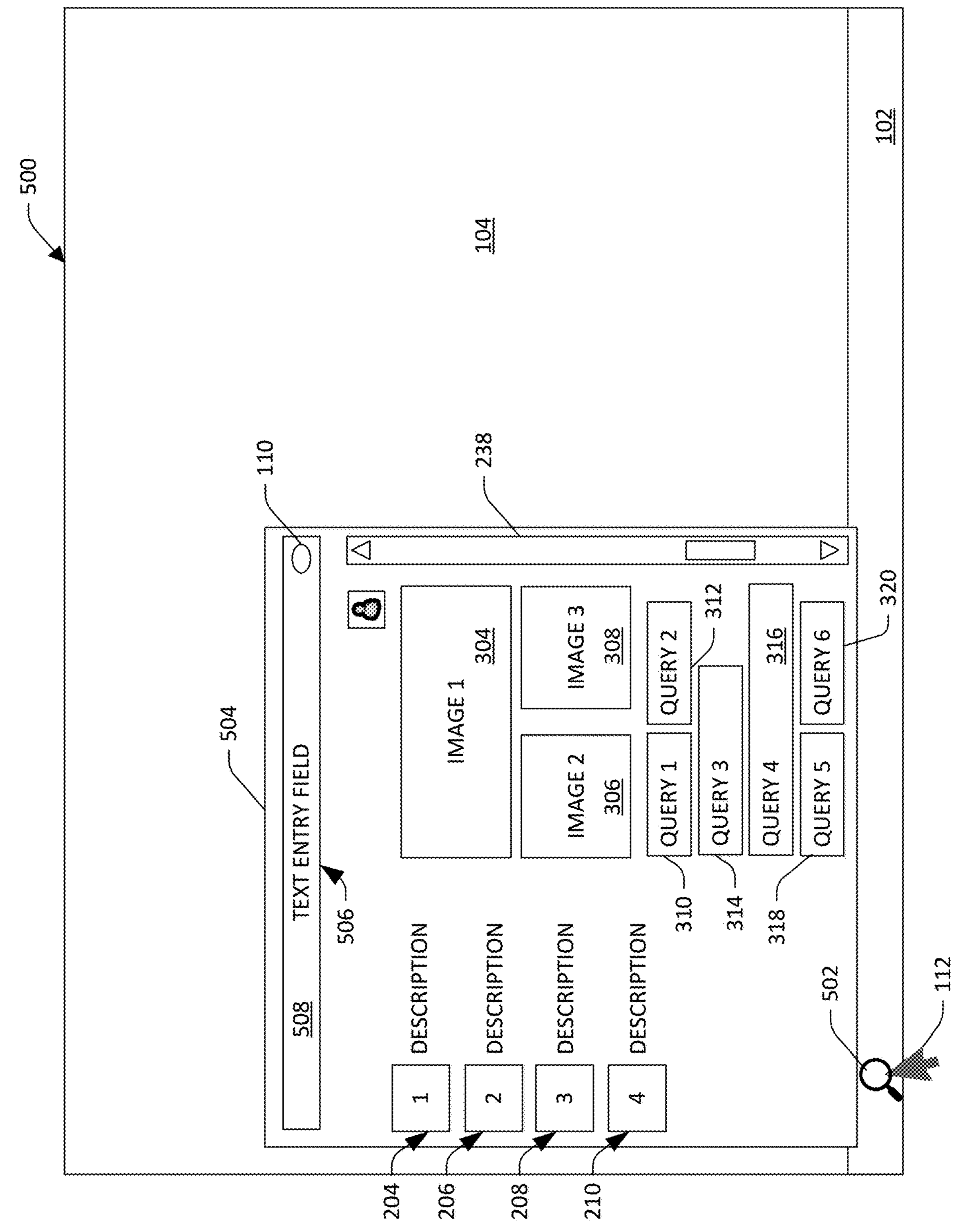
FIG. 5 is a schematic that depicts a graphical pane that includes content, where the graphical pane is presented in a GUI of an operating system in response to a selection of a graphical icon that corresponds to search functionality in a taskbar included in the GUI.

Reference is now made to FIG. 5. FIG. 5 depicts a GUI 500 of an operating system of a computing device, where the GUI 500 includes the taskbar 102 and the primary display area 104. The taskbar 102 includes a graphical icon 502 that corresponds to search functionality available by way of the computing device (e.g., the taskbar 102 fails to include a text entry field). Upon selection of the graphical icon 502 being detected, a third graphical pane 504 is presented in the GUI 500. The third graphical pane 508 includes the content included in the second graphical pane 302 illustrated in FIG. 3. More specifically, the third graphical pane 504 includes the images 304-308 and the query suggestions 310-320.

In addition, the third graphical pane 504 includes a text box 506, where the text box 506 includes a text entry field 508 and the graphical icon 110. In this example, when selection of the text entry field 508 is detected, the third graphical pane 504 is updated to depict the content included in the first graphical pane 202 shown in FIG. 2. As text is entered into the text entry field 508 or when a query is submitted by the user to the text entry field 508, the third graphical pane 504 can be updated to include search results identified as being relevant to the query.

Figure 6:
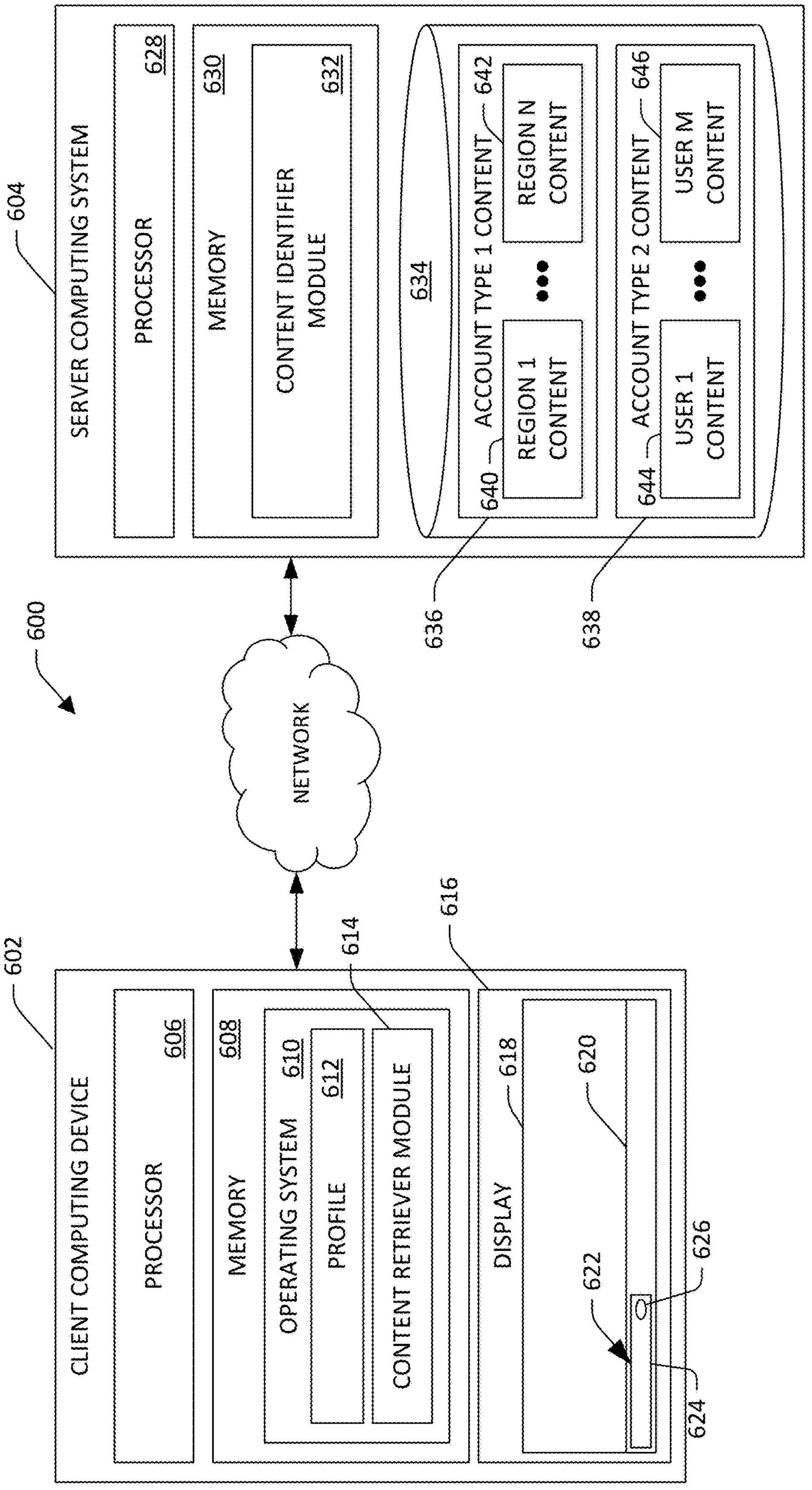
FIG. 6 is a functional block diagram of a computing system that facilitates presentment of content on a display of a computing device

Now referring to FIG. 6, a computing environment 600 that includes a client computing device 602 and a server computing system 604 is illustrated, where the client computing device 602 and the server computing system 604 are in communication with one another by way of a network 606 (e.g., the Internet).

The client computing device 602 includes a processor 606 and memory 608, where the memory 608 has an operating system 610 loaded therein. The operating system 610 includes or has access to a profile 612 of a user of the client computing device 602. While the profile 612 is illustrated as being stored on the client computing device 602, it is understood that at least some information in the profile 612 can be stored on the server computing system 604. The profile 612 can include information such as a geographic region that is to be assigned to the client computing device 602, a type of an account of the user of the client computing device 602 (e.g., a "consumer" or "enterprise" account type), an identifier for the user of the client computing device, amongst other information.

The operating system 610 further includes a data retriever module 614 that retrieves data from the server computing system 604. The data retriever module 614 can request data from the server computing system 604 upon the client computing device 602 being powered on, upon the user being authenticated by the client computing device 602 and/or server computing system 604, in response to a predefined event, or at predefined time intervals. In connection with requesting the data from the server computing system 604, the data retriever module 614 can transmit a request for data to the server computing system 604, where the request for data includes the geographic region and the account type included in the profile 612.

The client computing device 602 further includes a display 616, where the display 616 can be integral to the client computing device 602 or can be a separate display. A graphical user interface 618 of the operating system 610 is presented on the display 616, where the graphical user interface 618 includes a taskbar 620 that comprises a search box 622. The search box 622 includes a text entry field 624 and a graphical icon 626, as described above. Alternatively, the taskbar 620 can include the graphical icon 626 without the text entry field 624, similar to the GUI 500 illustrated in FIG. 5.

The server computing system 604 includes a processor 628 and memory 630. The memory 630 includes a data identifier module 632 that identifies data to provide to the client computing device 602 based upon the request for data generated by the data retriever model 614. The server computing system 604 also includes a data store 634, were the data store 634 includes data that can be provided to the client computing device 602. In an example, the data store 634 includes account type 1 data 636 and account type 2 data 638. The account type 1 data 636 can be data that is provided to computing devices being used by users with "consumer" account types, while the account type 2 data 638 includes data that is to be provided to computing devices being used by users with "enterprise" account types. The account type 1 data 636 includes data for different geographic regions. For example, the account type 1 data 636 includes region 1 data 640—region N data 642. The region 1 data 642 is data that is to be provided to computing devices assigned to a first geographic region, while the region N data 642 is data that is to be provided to computing devices assigned to an Nth region. In an example, the region 1 data 640 incudes a first graphical icon and first content that is thematically related to the first graphical icon, and the region N data 642 includes an Nth graphical icon and Nth content that is thematically related to the Nth graphical icon.

The account type 2 data 638 includes data that is to be provided to different users. For example, the account type 2 data 638 includes first user data 644—Mth user data 646. The first user data 644 is data that is to be provided to the client computing device 602 when the first user is operating the client computing device 602, and the Mth user data 646 is data that is to be provided to the client computing device 602 when an Mth user is logged into the client computing device 602. The user 1 data 644 includes a graphical icon and content for a first user, while the user M data includes a graphical icon and content for an Mth user.

In operation, at a predetermined time, upon occurrence of a predefined event, when a user logs into the client computing device 602, or when the client computing device 602 is powered on, the data retriever model 614 obtains information from the profile 612 and generates a request for data, where the request for data includes the information obtained from the profile 612. The information obtained from the profile 612 can include a geographic region, an account type, a user identifier, etc.

The client computing device 602 transmits the request for data to the server computing system 604. The data identifier module 632 obtains data from the data store 634 based upon the information included in the request for data. Hence, when the request for data indicates that the account type is "consumer" and the geographic region is region 1, the data identifier module 632 can obtain the region 1 data 640 and transmit the region 1 data 640 to the client computing device 602 by way of the network 606. In the event that there is no content for the region identified in the profile 612, the content identifier module 632 can retrieve automatically generated content, such as "word of the day", "quote of the day", "this day in history", and other content that is subject to change but can be programmatically generated, such that different content can be provided at different times. When server computing system 604 includes content for the region specified in the profile 612, the graphical icon 626 is updated to be the graphical icon included in the region 1 data 640. As described previously, after the client computing device 602 has received the data and updated the graphical icon 626, content included in the region 1 data 640 can be presented on the display 616 of the client computing device 602 in response to selection of the graphical icon 626 being detected. In another example, when the request for data indicates an account type 2 and further indicates that the client computing device 602 is up being operated by the first user, the data identifier module 632 can retrieve the user 1 data 644 from the data store 634 and cause the server computing system 604 to transmit the user 1 data 644 to the client computing device 602, whereupon the client computing device updates the graphical icon 626 with a graphical icon included in the user 1 data 644. When selection of the graphical icon 626 is detected, content in the user 1 data is presented on the display 616 (in a graphical pane).

While certain types of content have been described, it is to be understood that any suitable content customized for a user can be presented to the user upon detection of the selection of the graphical icon 626. For example, content can be automatically generated based upon observed user interaction with webpages. For instance, if a user of the client computing device 602 is inferred to be interested in a certain type of sporting event based upon observed interactions of the user with webpages, the server computing system 604 can generate content that is customized for the user by scraping information from sports webpages (e.g., webpages known to be visited by the user). In another example, the profile 612 can explicitly identify topics of interest to the user, and the server computing system 604 can generate data for the user based upon the explicitly identified topics. Thus, it is to be understood that content can be programmatically generated or manually generated by people employed by operators of these server computing system 604.

FIG. 6 depicts a conventional client-server communications model. As cloud computing technologies continue to advance, however, other client-server models may become prevalent. In an example, the client 602 may be a "thin" client that executes a web browser or other suitable application that can communicate with the server computing system 604. The server computing system 604 can execute a virtual machine (VM), where the VM executes the operating system 610. The VM can then transmit graphics data to the client computing device 602, and such graphics data is displayed on the display (such as the graphical user interfaces shown in FIGS. 1-5). Therefore, server computing system 604 (in a VM) executes the operating system 610, executes applications requested by the user of the client computing device 602, stores data on behalf of the user, etc. In such embodiment, the user experience is largely the same; a selection of the graphical icon 626 is detected and content is presented on the display 616. In this example, however, the VM executing on the server computing system 604 creates the graphical user interface and transmits the graphical user interface for presentment on the display 616.

Figure 7:
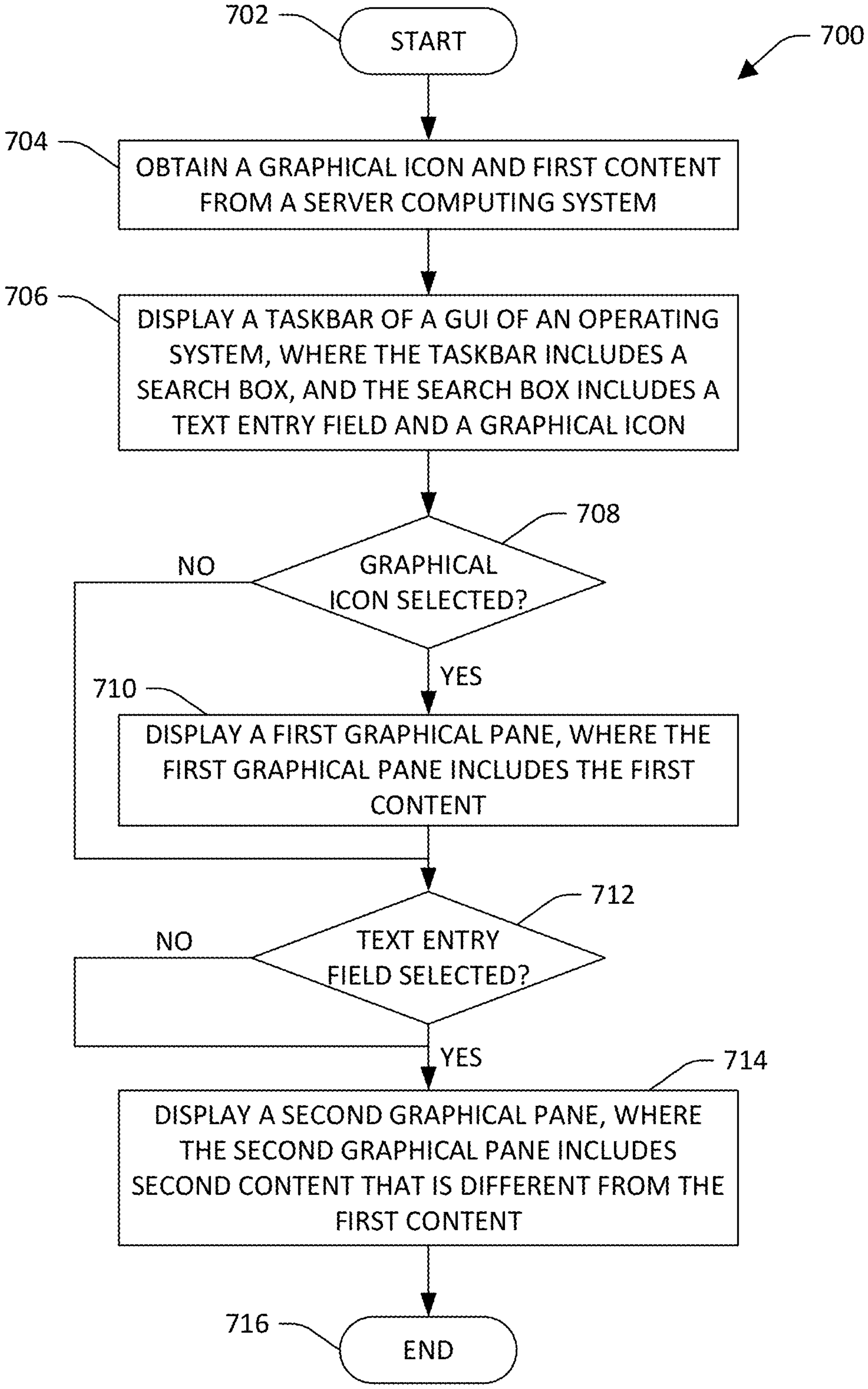
FIG. 7 is a flow diagram depicting a methodology for displaying different content depending upon which portion of a search box in a taskbar included in a GUI of an operating system is selected.
Figure 8:
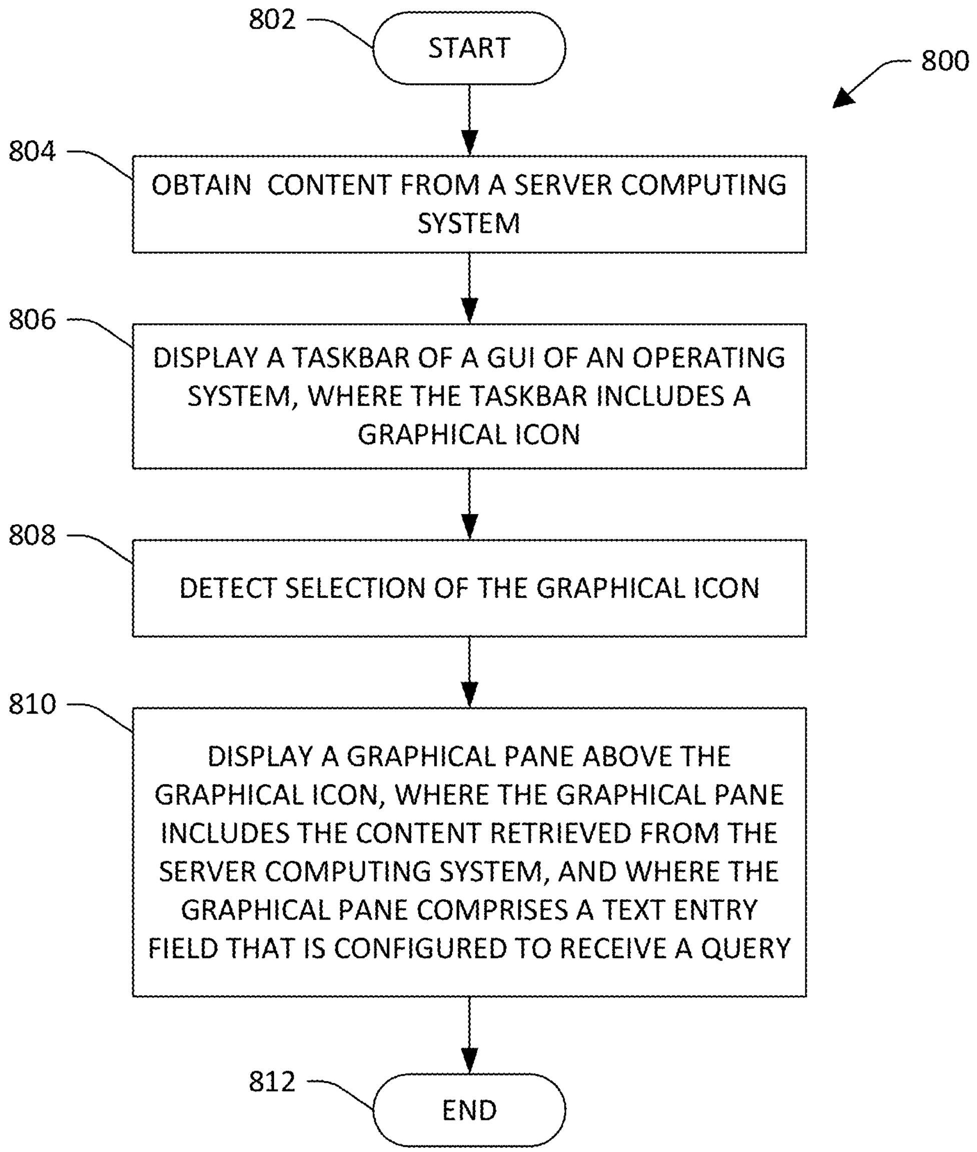
FIG. 8 is a flow diagram illustrating a methodology for proactively presenting content on a display of a computing device.
Figure 9:
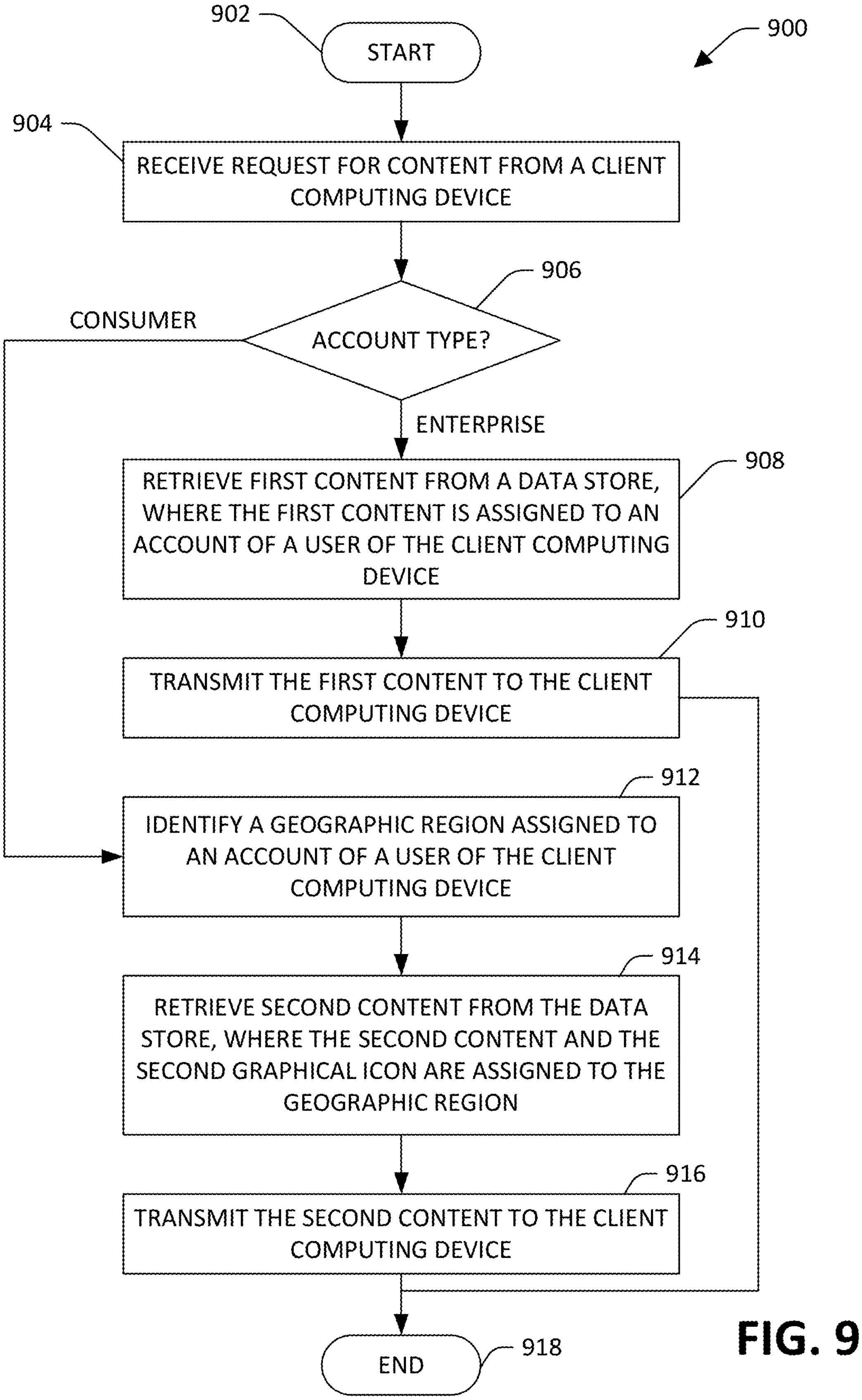
FIG. 9 is a flow diagram illustrating a methodology for identifying data to provide to a computing device.

FIGS. 7-9 illustrate methodologies relating to proactive provision of data to users of computing devices. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning now solely to FIG. 7, a flow diagram depicting a method 700 for displaying different content in a GUI of an operating system on a computing device depending upon whether selection of a text entry field or a graphical icon in a search box is detected is illustrated. The method 700 is performed by a client computing device. The method 700 starts at 702, and at 704 a graphical icon and first content are retrieved from a server computing system. As described previously, the graphical icon and the first content are thematically related.

At 706, a taskbar of an operating system GUI is displayed on a display of the computing device. The taskbar includes a search box, where the search box includes a text entry field and the graphical icon obtained from the server computing system. The text entry field is configured to receive textual input from a user of the computing device upon the text entry field being selected.

At 708 a determination is made as to whether the graphical icon in the search box has been selected. When it is determined that the graphical icon has been selected, at 710 a first graphical pane is displayed, where the first graphical pane includes the first content. As described previously, the first content can be at least partially customized for the user. For instance, the first content can pertain to a geographic location assigned to the computing device.

At 712, a determination is made as to whether the text entry field of the search box has been selected. When it is determined that the text entry field of the search box has been selected, a second graphical pane is displayed on the display of the computing device. The second graphical pane includes second content that is different from the first content. The methodology 700 completes at 716.

Turning now to FIG. 8, a flow diagram illustrating a method 800 for displaying content in response to a graphical icon in a taskbar of a GUI of an operating system being selected is illustrated. The methodology 800 starts at 802, and at 804 content is obtained from a server computing system. At 806, a taskbar of a GUI of an operating system is displayed, where the taskbar includes a graphical icon. In an example, the taskbar fails to include a text entry field.

At 808, selection of the graphical icon is detected. At 810, based upon the detection of the selection of the graphical icon, a graphical pane is displayed above the graphical icon (such that the graphical pane appears to extend from the taskbar). The graphical pane includes the content obtained from the server computing system at 804. Further, the graphical pane includes a text entry field that is configured to receive a query from a user of the computing device. Upon the text entry field being selected, different content can be included in the graphical pane. The method 800 completes at 812.

Now referring to FIG. 9, a method 900 performed by a server computing system is illustrated. The method 900 starts at 902, and at 904 a request for data is received from a client computing device. The request for data can include information as to an account type associated with the client computing device, an identifier of a user of the client computing device, a geographic region assigned to the client computing device, etc.

At 906, a determination is made as to an account type identified in the request for content. When it is determined at 906 that the account type is "enterprise", the method 900 proceeds to 908, where data is retrieved from a data store, and further where the data includes first content and a first graphical icon. At least the first content is assigned to an account of a user of the client computing device. At 910, the first data is transmitted to the client computing device.

When it is determined at 906 that the account type is "consumer", the method 900 proceeds to 912, where an identity of a geographic region included in the request for data is determined. At 914, second data is retrieved from the data store, where the second data includes a second graphical icon and second content. The second data is assigned to the geographic region identified in the request for content received at 904. At 916 the second data is transmitted to the client computing device. The method 900 completes at 918.

Figure 10:
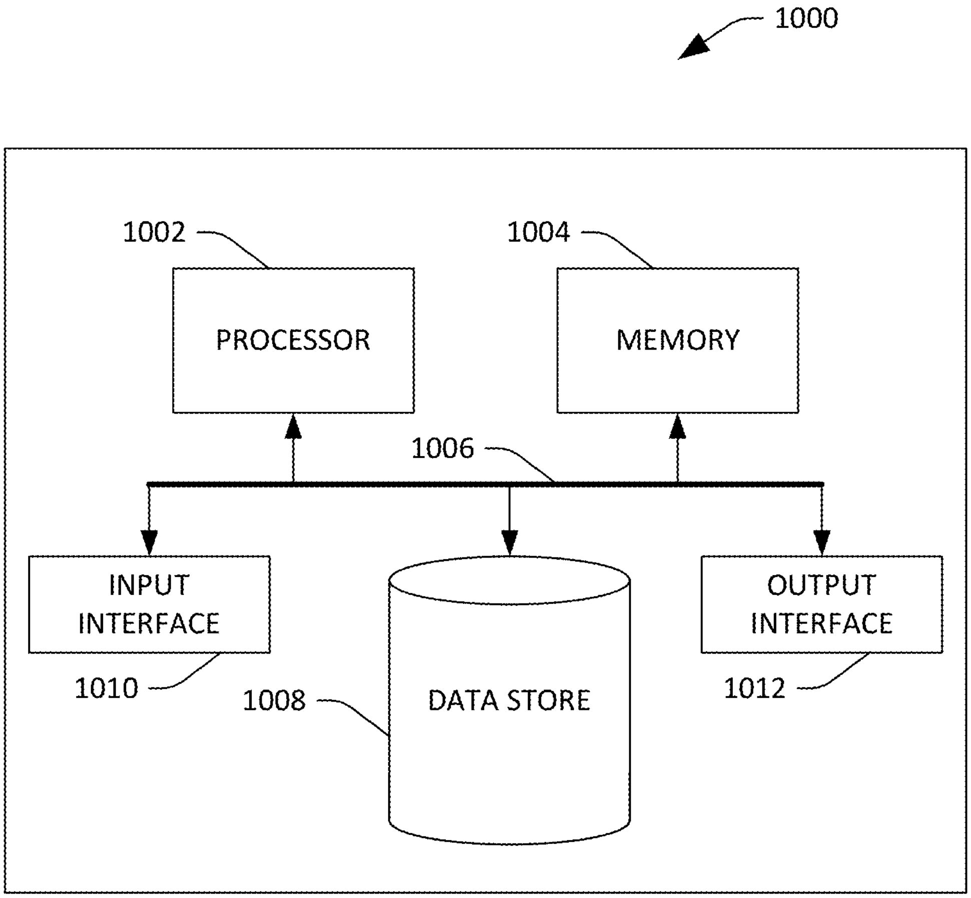
FIG. 10 is a functional block diagram of a computing system.

Referring now to FIG. 10, a high-level illustration of an exemplary computing device 1000 that can be used in accordance with the systems and methodologies disclosed herein is illustrated. For instance, the computing device 1000 may be a client computing device that has an operating system stored thereon, where the operating system includes a GUI having a taskbar that includes a graphical element pertaining to search functionality. By way of another example, the computing device 1000 can be a server computing system that proactively provides data to client computing devices. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store content, graphical icons, profile information, etc.

The computing device 1000 additionally includes a data store 1008 that is accessible by the processor 1002 by way of the system bus 1006. The data store 1008 may include executable instructions, graphical icons, profile information, content, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device comprising:

a processor;

a display that is in communication with the processor; and memory storing an operating system, where the operating system, when executed by the processor, causes the processor to perform acts comprising:

causing a graphical user interface (GUI) to be displayed on the display, where the GUI includes a search bar, and further where the search bar includes:

a search field that is configured to receive textual input from a user of the computing device upon the search field being selected by the user of the computing device; and a graphical button that is selectable by the user of the computing device; wherein:

upon the search field being selected by the user when the search field is empty, a first graphical pane is presented on the display, where the first graphical pane includes first pre-search suggested content; and upon the graphical button being selected by the user when the search field is empty, a second graphical pane is presented on the display, where the second graphical pane includes second pre-search suggested content that differs from the first pre-search suggested content.

2. The computing device of claim 1, where the search bar is presented in a task bar positioned at a bottom of the GUI on the display.

3. The computing device of claim 1, where the graphical button comprises a graphic that is representative of a theme or topic, and further where the second content pertains to the theme or topic.

4. The computing device of claim 1, the acts further comprising:

prior to the second graphical pane being presented on the display, causing the computing device to transmit data that is indicative of a geographic location of the computing device to a server computing system that is in network communication with the computing device, where the second content is identified by the server computing system based upon the data that is indicative of the geographic location of the computing device; and subsequent to causing the computing device to transmit the data to the server computing system, receiving the second content from the server computing system.

5. The computing device of claim 1, the acts further comprising:

prior to the graphical button being displayed in the search bar, causing the computing device to transmit data that is indicative of a geographic location of the computing device to a server computing system that is in network communication with the computing device, where graphics of the graphical button are identified by the server computing system based upon the data that is indicative of the geographic location of the computing device; and subsequent to causing the computing device to transmit the data to the server computing system, receiving the graphics of the graphical button from the server computing system.

6. The computing device of claim 1, where the first content includes at least one of a computer-executable item previously interacted with by a user of the computing device or a computer-executable application that is installed on the computing device.

7. The computing device of claim 1, where the second content comprises an image and text that is descriptive of the image, the acts further comprising:

receiving a selection of the image, where the image has a webpage assigned thereto; and causing a web browser to load the webpage in response to receipt of the selection of the image.

8. The computing device of claim 1 being a mobile telephone.

9. The computing device of claim 1, where the second content includes information that pertains to the user of the computing device and an enterprise to which the user belongs.

10. The computing device of claim 9, where the second content includes at least one of information about a meeting extracted from an electronic calendar of the user or an identity of a contact of the user in the enterprise.

11. The computing device of claim 1, where the first content includes a selectable query suggestion, where a browser is launched in response to the selectable query suggestion being selected and search results identified based upon the selectable query suggestion are presented in the browser.

12. The computing device of claim 1, where the second content is presented in the second pane based upon a type of account of the user from amongst several different types of account.

13. The computing device of claim 1, where the GUI includes a primary display area that is displayed concurrently with at least one of the first pane or the second pane.

14. The computing device of claim 1, where the first pane and the second pane have a same size and a same shape.

15. The computing device of claim 1, where the second content includes query suggestions that represent queries previously submitted to a search engine by several users.

16. A method performed by a computing device, the method comprising:

transmitting feature data to a server computing system that is based upon a feature of the computing device;

receiving, from the server computing system, first pre-search suggested content, where the first pre-search suggested content is based upon the feature data;

displaying a graphical user interface (GUI) in a display of the computing device, where the GUI comprises a search bar, and where the search bar includes:

a search field that is configured to receive textual input from a user of the computing device upon the search field being selected by the user of the computing device; and a graphical button that is selectable by the user of the computing device;

receiving a first indication that the search field has been selected by the user when the search field is empty;

in response to receiving the first indication, displaying a first graphical pane in the GUI, where the first graphical pane includes second pre-search suggested content that differs from the first pre-search suggested content;

receiving a second indication that the graphical button has been selected by the user when the search field is empty; and in response to receiving the second indication, displaying a second graphical pane in the GUI, where the second graphical pane includes the first pre-search suggested content, and further where the first pre-search suggested content differs from the second pre-search suggested content.

17. The method of claim 16, where feature of the computing device is a geographic location assigned to the computing device.

18. The method of claim 16, where the feature of the computing device is a type of account assigned to the computing device when the user is logged into the computing device.

19. The method of claim 16, where the graphical button comprises content that is representative of a theme, and further where the first content corresponds to the theme.

20. A client computing device comprising:

a processor; and memory storing instructions that, when executed by the processor, cause the processor to perform acts comprising:

causing a graphical user interface (GUI) to be displayed on a display to a user, where the GUI includes a search bar, and further where the search bar includes:

a search field that is configured to receive textual input from the user upon the search field being selected by the user; and a graphical button that is selectable by the user;

upon the search field being selected by the user when the search field is empty, causing a first graphical pane to be presented to the user, where the first graphical pane includes first pre-search suggested content; and upon the graphical button being selected by the user when the search field is empty, causing a second graphical pane to be presented to the user, where the second graphical pane includes second pre-search suggested content that differs from the first pre-search suggested content.

* * * * *